United States Patent [19]
Gee

[11] Patent Number: 5,538,111
[45] Date of Patent: Jul. 23, 1996

[54] VEHICLE BRAKE DRUM HAVING A CRACKED SURFACE FOR INCREASING VIBRATION DAMPENING

[75] Inventor: Thomas A. Gee, Allen Park, Mich.

[73] Assignee: Eaton Corporation, Cleveland, Ohio

[21] Appl. No.: 507,133

[22] Filed: Jul. 31, 1995

[51] Int. Cl.⁶ ................................................. F16D 65/10
[52] U.S. Cl. ........................................ 188/78; 188/218 R
[58] Field of Search ................................ 188/78, 218 A, 188/218 R, 218 XL; 301/6.1, 6.91; 29/894.32, 894.324; 192/113.22

[56] References Cited

U.S. PATENT DOCUMENTS

| | | | |
|---|---|---|---|
| 2,532,086 | 11/1950 | Chapman et al. | 188/218 A |
| 2,702,613 | 2/1955 | Waltheu, Jr. | 188/218 R |
| 2,858,913 | 11/1958 | Afanador | 188/218 R |
| 5,383,539 | 1/1995 | Bair et al. | 188/218 R |
| 5,390,769 | 2/1995 | Bair et al. | 188/218 R |

FOREIGN PATENT DOCUMENTS

| | | | |
|---|---|---|---|
| 203755 | 7/1939 | Germany | 188/218 R |
| 406347 | 2/1934 | United Kingdom | 188/218 R |

*Primary Examiner*—Robert J. Oberleitner
*Assistant Examiner*—Chris Schwartz
*Attorney, Agent, or Firm*—Loren H. Uthoff, Jr.; Howard D. Gordon

[57] ABSTRACT

A brake drum assembly with a cylindrical brake drum having an open end and a flanged end and an axis of rotation where an annular squealer band is formed on the brake drum approximately adjacent to the flanged end. A plurality of fracture apertures are formed in the squealer band and axially extend through the squealer band parallel to the axis of rotation of the brake drum. The fracture apertures are randomly circumferentially spaced along the squealer band and/or randomly angled relative to the axis of rotation. The squealer band is then cracked from the fracture apertures radially outward to the outer surface of the squealer band thereby providing friction dampening as vibration in the brake drum and squealer band cause relative motion within each crack. In an alternative embodiment, fracture apertures are formed in the brake drum adjacent to the open end and oriented radially inward where the brake drum is cracked from each fracture aperture toward the open end.

5 Claims, 3 Drawing Sheets

VEHICLE BRAKE DRUM HAVING A CRACKED SURFACE FOR INCREASING VIBRATION DAMPENING

BACKGROUND OF THE INVENTION

1. Field of the Invention

The present invention relates to a vehicle brake drum. More specifically, the present invention relates to a vehicle brake drum having a squealer band where the squealer band has a plurality of fractures to provide increased vibration dampening for noise reduction.

2. Description of the Prior Art

Prior art methods to reduce the noise of squealing brake drums generated when the brakes are applied include adding a dampening material over the outer surface of the drum and/or fitting spring clips between the squealer band and the wheel to provide frictional dampening. The squealer band is comprised of an annular ring of material formed as part of the brake drum during the casting process usually positioned adjacent to the open end of the brake drum. The purpose of the squealer band is to attenuate brake squeal noise by altering the vibration characteristics of the brake drum. U.S. Pat. Nos. 5,383,538; 5,383,539 and 5,390,769 all assigned to same assignee, Eaton Corporation, as the present invention illustrate methods of reducing brake squeal by introducing additional frictional damping using clips or rings fitted between the wheel and the brake drum. One of the problems of the solution to increasing vibration damping as shown in the prior art, is with the number of additional parts and assembly complications due to the fitting of clips or a ring to the wheel/brake assembly. Also, as the clips lose tension due to heat cycling, the level of frictional dampening is reduced thereby increasing the brake squeal noise. Any method of permanently increasing dampening of the brake drum without the use of additional parts would lower cost and complexity while lowering the level of noise generated by brake squeal.

SUMMARY OF THE INVENTION

The present invention increases the level of frictional vibration dampening in a vehicle brake drum by introducing a crack in an outside section of the squealer band. A plurality of axially extending fracture apertures (holes) are created axially through the squealer band and then the squealer band is fractured (cracked) from the edge of the fracture aperture to the outer surface of the squealer band. By cracking the outer section of the squealer band, frictional dampening is increased due to the relative motion between the fractured surfaces. In this manner, the vibration energy created by drum and shoe interactions which generates brake squeal noise is dissipated and the level of radiated brake squeal noise is reduced.

In an alternate embodiment, radial fracture apertures are formed in the brake drum adjacent to the open end. Dampening cracks are then created which extend from the fracture apertures to the open end of the brake drum thereby increasing the level of frictional vibration dampening.

DETAILED DESCRIPTION OF THE PREFERRED EMBODIMENT

Figure 1:
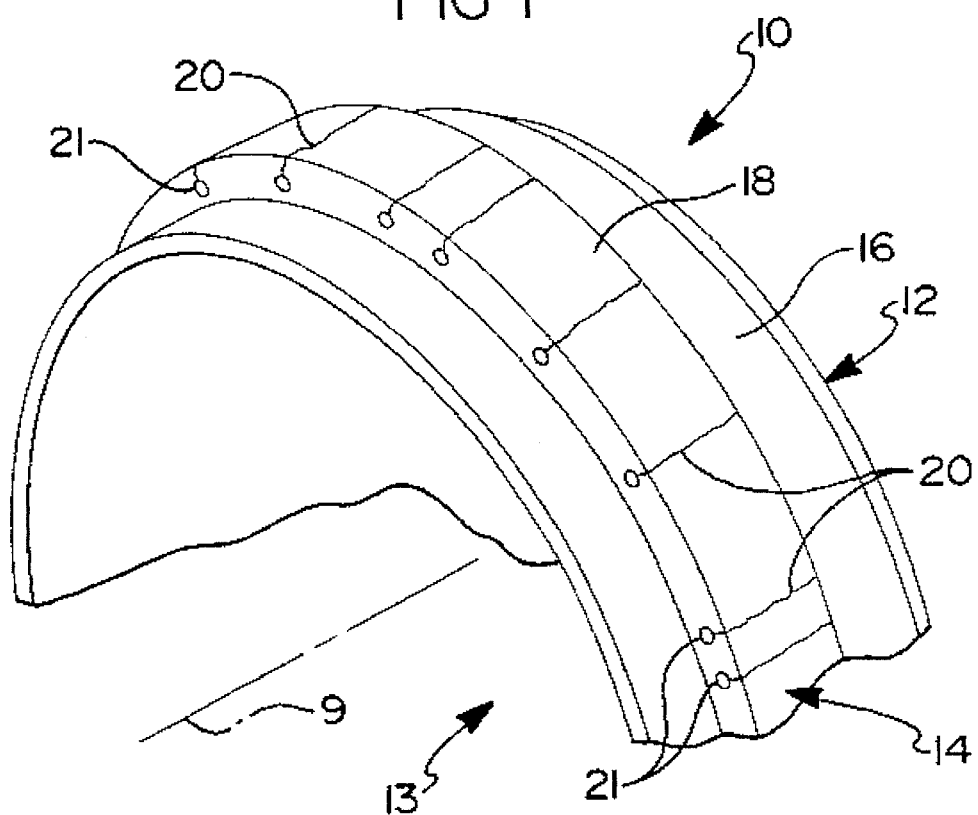
FIG. 1 is a partial perspective view of the brake drum assembly of the present invention.

Now referring to FIG. 1 of the drawings, a partial perspective view of the brake drum assembly 10 of the present invention is shown. A cylindrical brake drum 16 is shown having a flanged end 12 defined for purposes of this disclosure as any attachment means whereby the brake drum 16 is mounted to an axle and an open end 13 where the brake drum assembly 10 is typically mounted to a vehicle wheel and axle (not shown) and provides a braking force thereto. An annular squealer band 14 is formed on the outside surface of the brake drum 16 where the purpose of the squealer band 14 is to dampen vibration in the brake drum 16 created when the vehicle brake is energized. The noise created by these vibrations has been termed as brake squeal. According to the present invention, to further dampen the vibration of the brake drum 16, and thus reduce the level of brake squeal noise, a plurality of dampening cracks 20 are created in the outer surface 18 of the squealer band 14. When the squealer band 14 vibrates, the dampening cracks 20 also move where relative motion between each side of the dampening crack 20 creates a vibration dampening force thereby reducing the level of the vibration and the overall level of radiated noise emanating therefrom.

The dampening cracks 20 in the preferred embodiment are created in the outer surface 18 of the squealer band 14 by first drilling or otherwise forming a plurality of fracture apertures 21 axially extending through the squealer band 14, one each located where a dampening crack 20 is to be formed. The outside surface 18 of the squealer band 14 is then cracked at each fracture apertures 21 when the cracks extend radially outward from the fracture apertures 21 to the outer surface 18 of the squealer band 14. The outside surface 18 is cracked by creating a high stress in the desired area that the dampening crack 20 is to be formed. Since a cast iron material is usually employed to fabricate the brake drum 16 and squealer band 14, a variety of methods may be employed to create the dampening cracks 20. For example, a hardened steel ball that is slightly larger in size than the fracture apertures 21 can be forced through the fracture apertures 21 thereby inducing a stress that will crack the outer surface 18. As an alternative, a tungsten inert gas (TIG) torch can be used to apply intense localized heat to the area directly above the fracture apertures 21 which would cause the outer surface 18 to crack due to the induced thermal gradient. Any other method that would produce a crack directly above the fracture apertures 21 would be satisfactory. The fracture apertures 21 function to limit the dampening crack 20 propagation during the formation process so that they do not extend axially inward toward the brake drum 16 past the fracture aperture 21. They also function to limit crack propagation during the useful lifetime of the brake drum assembly 10.

The fracture apertures 21 are shown in FIG. 1 positioned along the circumference of the squealer band 14 with a random spacing to provide more effective dampening of the various modes of vibration of the brake drum 16. When specifying an irregular spacing, the balance of the wheel/tire/drum assembly must be considered to prevent unwanted vibration at high rotational speeds. It is contemplated that a symmetrical circumferential spacing of the fracture apertures 21 could also be utilized.

In the preferred embodiment the fracture apertures 21 are shown having a circular cross section. However, many types of cross-sectional shapes could be utilized such as triangular or square having an orientation with respect to the outer surface 18 of the squealer band 14 to facilitate the cracking process.

Figure 2:
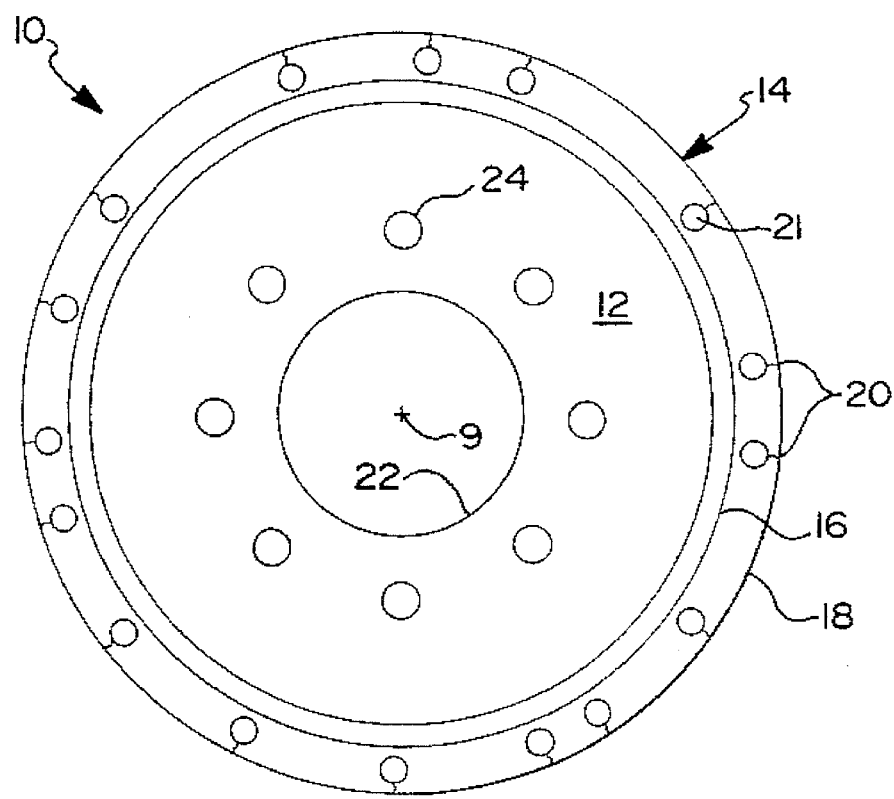
FIG. 2 is a front elevational view of the brake drum assembly of the present invention.

Now referring to FIG. 2, a frontal view of the brake drum assembly 10 of the present invention is shown. The squealer band 14 is formed as one piece with the brake drum 16. The cylindrical brake drum 16 has a flange end 12 with a center pilot 22 centered on the axis of rotation 9 which engages the vehicle axle. A plurality of bolt holes 24 encircle the center pilot 22 to be used for retention of the brake drum assembly 10 to the vehicle axle.

More clearly shown is an end view of the plurality of fracture apertures 21 which axially extend through the squealer band 14. The dampening cracks 20 extend radially outward from the fracture apertures 21 to the outer surface 18 of the squealer band 14.

Figure 3:
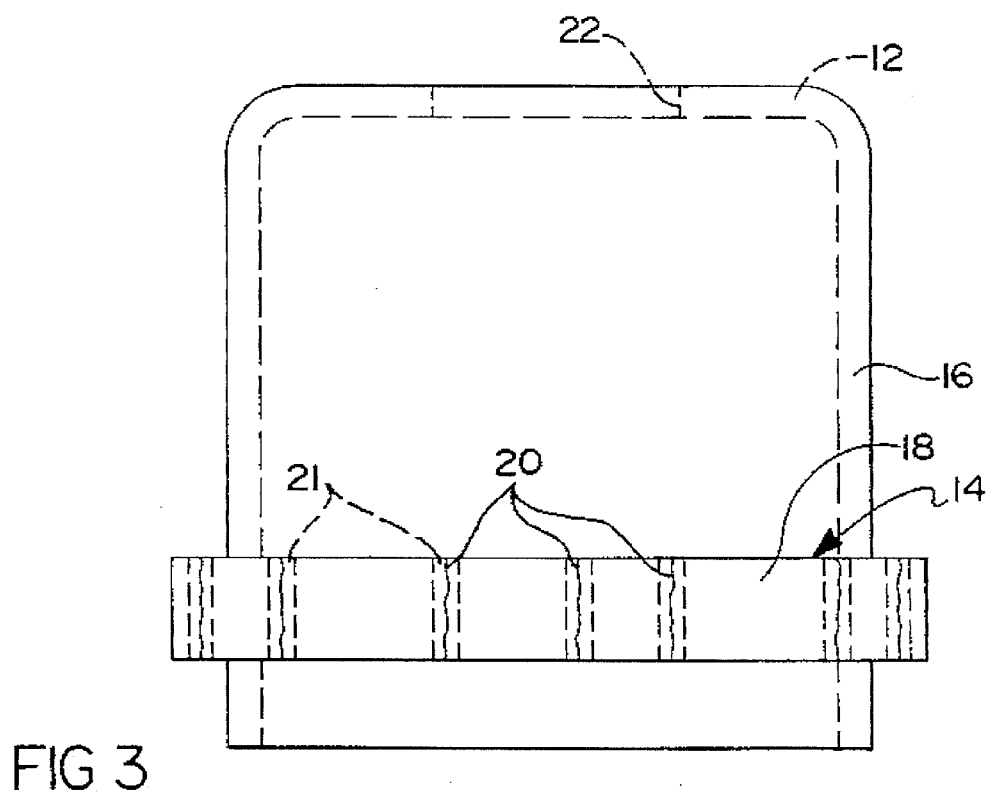
FIG. 3 is a top elevational view of the brake drum assembly of the present invention.

Now referring to FIG. 3, a top elevational view of the brake drum assembly 10 of the present invention is shown. Dampening cracks 20 are formed in the outer surface 18 of the squealer band 14 and extend to the fracture apertures 21. Vibration and the resultant noise generation of the brake drum 16 is dampened by the relative motion at each of the dampening cracks 20. Again the circumferential spacing is selected to optimize the dampening of the resonant vibration modes but as mentioned previously can be symmetrical.

Figure 4:
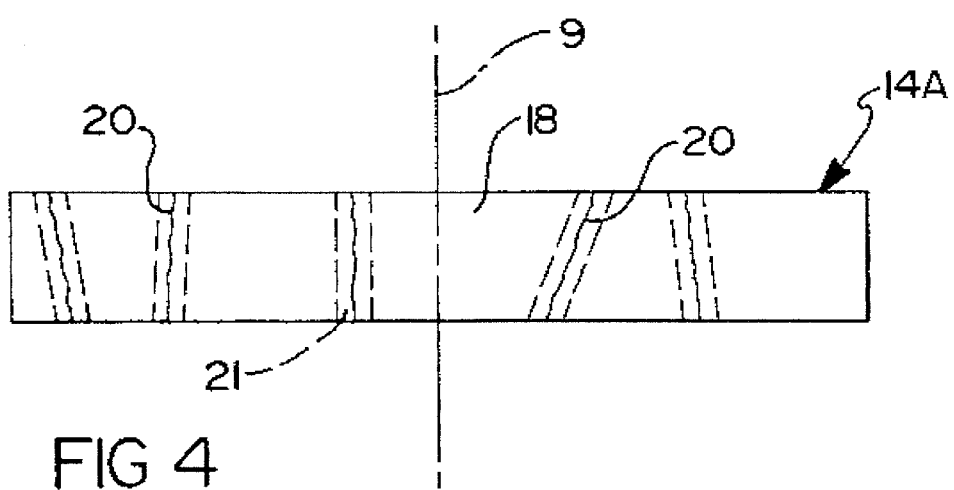
FIG. 4 is a top elevational view of an alternate embodiment of the squealer band of the present invention.

Now referring to FIG. 4, a top elevational view of an alternate embodiment of the squealer band of the present invention is shown. The fracture apertures 21 are angled relative to the axis of rotation 9 and may be oblique and/or parallel to the axis of rotation 9 to optimize the vibration dampening of the vibration modes of the brake drum 16. The fracture apertures 21 may also be formed at an angle relative to the outer surface of the brake drum 16.

Figure 5:
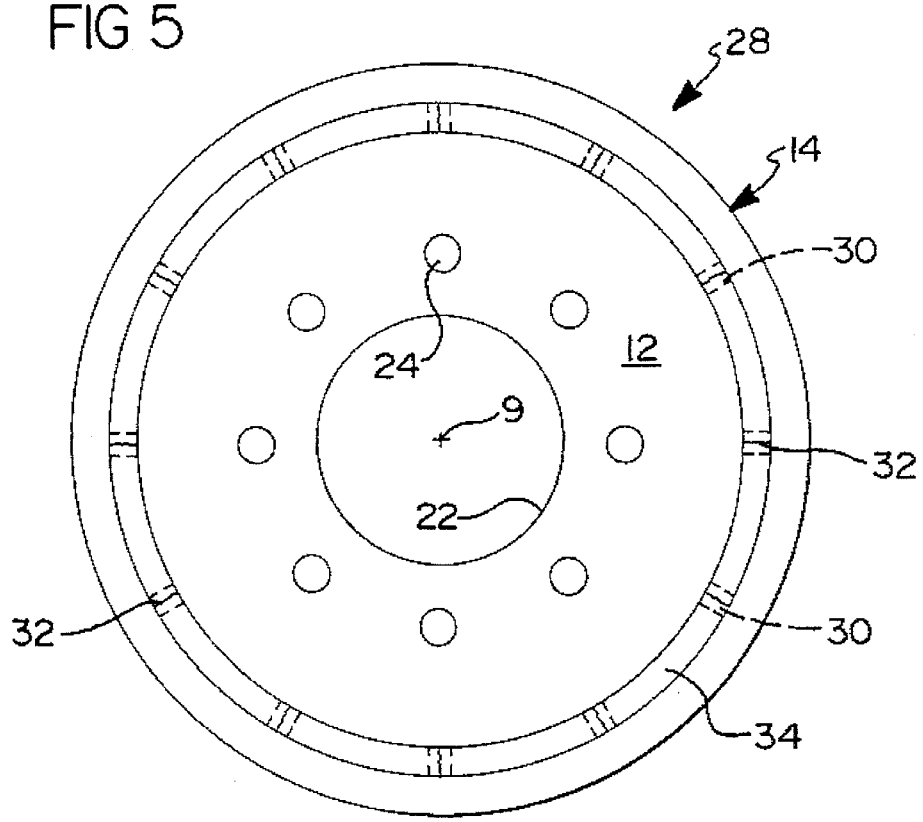
FIG. 5 is a front elevational view of an alternate embodiment of the brake assembly of the present invention.

Now referring to FIG. 5, a front elevational view of an alternative embodiment of the brake drum assembly 28 of the present invention is shown. A plurality of radially oriented fracture apertures 30 are formed in the brake drum 16 just inboard of the open end 13. Dampening cracks 32 are formed emanating from each of the fracture apertures 30 to the inner edge 34 of the brake drum 16 using methods described herein in reference to FIG. 1. The effect of the dampening cracks 32 is to again increase vibration damping in the brake drum 16 to lower the brake squeal noise level. The circumferential spacing of the fracture apertures 30 is shown in FIG. 5 as evenly spaced although random uneven spacing could be used depending on the modes of vibration that are to be dampened. The static and dynamic balance of the brake drum assembly 28 have to be considered when determining the optimum spacing of the fracture aperture 30.

Figure 6:
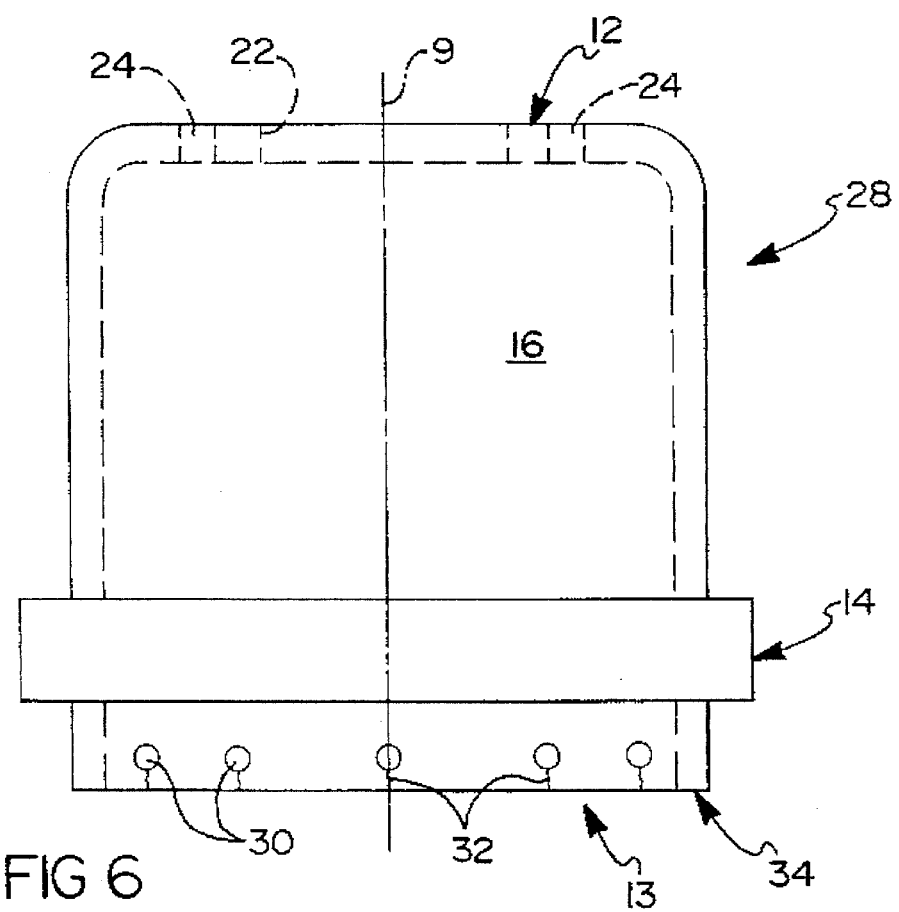
FIG. 6 is a top elevational view of the alternate embodiment shown in FIG. 5.

FIG. 6 is a top elevational view of the alternate embodiment of the present invention shown in FIG. 5. The fracture apertures 30 are oriented radially inward toward the axis of rotation 9 and are axially positioned close enough to the inner edge 34 such that the dampening cracks 32 are easily formed when stressed in the area of the fracture aperture 30. Ideally, a single dampening crack 32 will be formed at each fracture aperture 30. A squealer band 14 is shown formed as part of the brake drum 16, but in this embodiment its use would be optional.

Although this invention has been described in its preferred embodiment with a certain degree of particularity, it is understood such description is by way of example only and that many variations in the foregoing preferred embodiment are possible while remaining within the scope of the present invention. The present invention should thus not be considered limited to the preferred embodiment of the specific choices of materials, configurations, dimensions, applications or ranges of parameters employed therein.

I claim:

1. A brake drum assembly comprising:
    a cylindrical brake drum having a flanged end opposite an open end and having a drum outer surface therebetween, said brake drum having an axis of rotation;
    a squealer band formed on said drum outer surface, said squealer band having an outer surface generally parallel to said drum outer surface; said squealer band having a plurality of fracture apertures formed therein where each of said fracture apertures has a dampening crack extending from said fracture apertures to said outer surface of said brake drum, thereby increasing the level of vibration dampening in said brake drum.

2. The brake drum of claim 1, wherein said fracture apertures are circular in cross-section.

3. The brake drum of claim 2, wherein said fracture apertures are parallel to said axis of rotation.

4. The brake drum of claim 1, wherein the circumferential spacing of said fracture apertures is irregular.

5. The brake drum of claim 1, wherein said fracture apertures are orientated oblique to said axis of rotation.

* * * * *